Dec. 3, 1935.  W. J. MORRILL  2,023,237
CONDENSER MOTOR
Filed Nov. 4, 1932
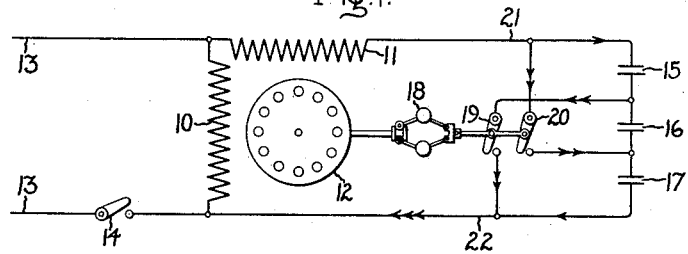
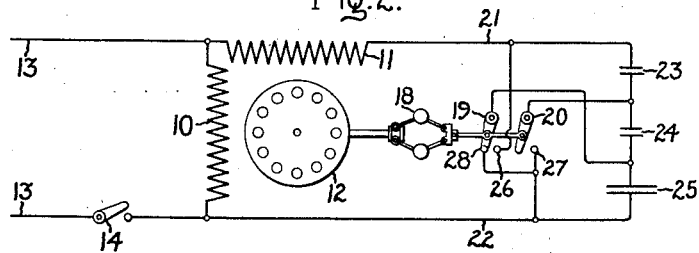
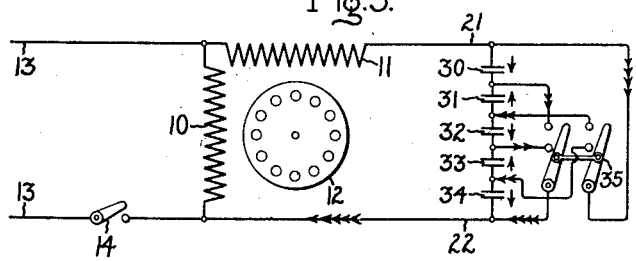
Inventor:
Wayne J. Morrill,
by Charles␣Muller
His Attorney.

Patented Dec. 3, 1935

2,023,237

UNITED STATES PATENT OFFICE 2,023,237

CONDENSER MOTOR

Wayne J. Merrill, Fort Wayne, Ind., assignor to General Electric Company, a corporation of New York Application November 4, 1932, Serial No. 641,202

1 Claim. (Cl. 172—233)

My invention relates to alternating current condenser motors of the single phase split phase type, and in particular to an improved and simplified scheme for varying the amount of capacitance between starting and running conditions.

The primary object of my invention is to provide low cost condenser motor equipment with simple control mechanism in which capacitance is employed both for starting and for power factor correction during running while utilizing the condenser equipment to the best advantage without subjecting to over-voltage, at the same time obtaining a high ratio of change in capacitance between starting and running conditions.

In carrying my invention into effect, I employ a plurality of condensers or capacitance groups for connection in parallel and series relation under starting and running conditions. By making the number of such groups odd, such as 3 or 5, I am able to employ relatively simple and inexpensive switching equipment and avoid the necessity of carrying any of the motor circuits through switch contacts during the running period of the motor, with the exception of the line switch contacts.

The features of my invention which are believed to be novel and patentable will be pointed out in the claim appended hereto. For a better understanding of the invention, reference is made in the following description to the accompanying drawing, showing in Fig. 1 an arrangement employing three equal condensers or capacitance groups which are connected in parallel at start and in series for running, giving a ratio of nine to one; Fig. 2 represents a modification where one of the condensers has a larger capacity than the other two and is short-circuited for running purposes, giving a ratio in the example given of ten to one; and Fig. 3 represents the use of five capacitance groups for obtaining a capacitance ratio of twenty-five to one between starting and running conditions.

In Fig. 1, I have shown a usual form of split phase motor, with the exception of the condenser equipment. The main winding is represented at 10 and the starting winding at 11. A rotor secondary of the squirrel cage variety is represented at 12. The line connections at 13 contain the usual line switch 14.

Permanently connected in series relation with the starting winding are the condensers 15, 16 and 17, and this circuit is permanently connected in parallel with the main winding 10. At 18 is a speed responsive device for operating a double pole single throw switch having blades 19 and 20. The switch is shown with both contacts open, which is the running condition.

To those familiar with the operation of apparatus of this character it will be appreciated that the arrangement just described is a highly desirable one, since during the normal running period of the motor there is no current flowing through movable contact points in the control circuits.

When the motor is at rest, and during the starting period, the speed responsive switch is closed, and in this position the three condensers are connected in parallel in the starting winding circuit. Thus, condenser 15 is connected across conductors 21 and 22 through blade 19, condenser 17 is connected across the same conductors through blade 20, and condenser 16 is connected across conductors 21 and 22 through both blades 19 and 20. The switch blades carry only two-thirds of the starting current, while the other one-third is carried through the permanent connections to the terminal condensers. The direction of current flow at a given instant is represented by the arrows, and the number of heads in each arrow represent the relative current magnitudes in the circuits during the starting connection. This gives a ratio of capacitance of 9 to 1 between starting and running conditions. Thus, under normal running conditions no current is carried through the contacts of the control switch, while during the short starting period only a portion of the current is carried therethrough. In both connections the permanent connections are utilized but not disturbed.

In this form of motor, the capacitance volt amperes should be appreciably greater at start than during running. On the other hand, the voltage across the entire condenser equipment rises considerably between starting and running conditions, due to the rise in voltage across the starting winding, and this can be controlled somewhat by design, as by changing the resistance of the squirrel cage and the relative number of turns in the main and starting windings of the motor. To use the condenser equipment most efficiently, the voltage across a given condenser should not be in excess of its rated voltage during continuous operation, since too high a voltage under these conditions produces undue heat and short life. On the other hand, if the condenser equipment is run considerably below its rated voltage, it results in an uneconomical use of the condenser equipment. During the short starting period it is advantageous to use a higher than rated voltage across a given condenser, since during this short period this will do no harm and saves in the condenser costs.

The above statement applies to the modern paper type of condenser. If a condenser be of the electrolytic type it should not be operated at other than approximately the rated voltage. Operation of an electrolytic condenser at too low a voltage results in the deformation of the film, which reduces its efficiency and useful life at normal voltage. In general, the electrolytic type of condenser is not suitable for continuous operation, but conditions arise where it is advantageous to use such a condenser during the starting period.

I consider that by means of my invention I am able to more nearly approach the correct change in capacitance ratio, while maintaining a more nearly desirable voltage relation across each condenser between starting and running conditions, without sacrifice in motor design, than has been possible with previous schemes for solving this complicated problem. Heretofore, the capacitance ratio between starting and running conditions has been appreciably less.

In Fig. 2, the motor is similar to that shown in Fig. 1, but the condenser equipment is modified to obtain a ratio between starting and running conditions of ten to one. Here condensers 23 and 24 have a smaller capacity than condenser 25. To give an example, condensers 23 and 24 may be each of 20 microfarads capacity, and condenser 25 of 60 microfarads capacity. The latter which is used only at start may be of the electrolytic type. At start, the condensers are connected in parallel in the starting winding circuit, as in Fig. 1, when the control switch blades 19 and 20 are thrown to the right on contacts 26 and 27, at which time we have 100 micro-farads capacity in the starting winding circuit.

For running, the control switch is in the position shown, condenser 25 is short-circuited through switch blade 19 and contact 28 while condensers 23 and 24 are connected in series with the starting winding through the same control circuit. The permanent series connections are not disturbed. Now the capacity in the starting winding circuit is determined by the smaller condensers connected in series, giving a ratio of 10 to 1 between these two conditions. By an economical design of the motor the voltage relation across the condenser equipment between starting and running conditions may be made about in the ratio of 110 to 180, so that with 110 volts across the condensers at start we have 180 volts across condensers 23 and 24 in series, or 90 volts across each during running. This illustrates the flexibility of the scheme to obtain different ratios while maintaining approximately rated voltage across the condensers in use during starting and running conditions without unduly complicating the control switch. It will be appreciated that by changing the relative value of the capacitance of condenser 25 with respect to that of condensers 23 and 24 in Fig. 2, we may obtain a wide variety of capacitance ratios between starting and running conditions. Thus by making condensers 23, 24, and 25 of 20, 20 and 110 microfarads capacity, respectively, the capacitance at start is their sum, or 150, and for running it is half of one of the series connected condensers, or 10, or a ratio of 15 to 1.

If it is desired to go to still higher ratios, we approach the point where it will be desirable to go to the arrangement shown in Fig. 3, using five equal condensers 30 to 34, inclusive, in parallel at start and in series for running, giving a ratio of 25 to 1. During normal running the permanent connection shown with the control switch 35 opened is used, there being no control circuit carried through any switch contact. With switch 35 closed, the condensers are connected in parallel, four-fifths of the current in the starting winding circuit going through the control switch, and the other one-fifth going through the permanent connections to the end condensers, as indicated by the arrows.

From the above it is seen that by the use of an odd number of condensers a wide variety of capacitance ratios may be had with very simple control mechanism, and that for certain ratios we obtain the advantage of permanent connections during running conditions and a reduction in starting current through the switch contacts at starting. These same advantages cannot be obtained with the use of an even number of condensers.

Such other modifications of my invention as will occur to those skilled in the art are intended to be included within the scope of the appended claim.

What I claim as new and desire to secure by Letters Patent of the United States is:

A condenser motor having main and starting windings, an odd number of condensers greater than one, means permanently connecting said condensers in series relation with the starting winding, and the series connection thus formed in parallel with the main winding, one of said condensers having a greater capacitance than the other two, and means for connecting said condensers in multiple for starting the motor and short-circuiting the larger condenser for running conditions.

WAYNE J. MORRILL.